United States Patent Office 3,375,117
Patented Mar. 26, 1968

3,375,117
METHOD OF PRODUCING FROZEN DOUGH
Sebastian Schremmer, 6 Lexenriederweg 8908,
Krumbach, Swabia, Germany
No Drawing. Filed Feb. 17, 1965, Ser. No. 433,520
Claims priority, application Germany, Feb. 18, 1964,
Sch 34,661
10 Claims. (Cl. 99—90)

ABSTRACT OF THE DISCLOSURE

A baking dough of prolonged storability is produced of flour and dough-forming constituents by cooling the flour and preferably the constituents to a temperature below about 0° C. so that upon subsequent mixing of the flour and dough-forming constituents a dough will be formed which ab initio has a temperature of between about 0.5° C. and −10° C., and preferably of no more than 0° C. Without permitting intermediate increasing of the temperature of the dough to a significant extent, the thus-formed cold dough is then further cooled, i.e. subjected to deep freezing down to a temperature not higher than about −20° C. The thus-formed dough, due to the fact that at no time the temperature thereof has been higher than +5° C. or preferably 0° C., will be of prolonged storability.

---

The present invention relates to a method of producing dough and, more particularly, the present invention is concerned with producing dough which can be frozen, stored for prolonged periods of time in deep frozen condition and thereafter subjected to baking.

According to conventional methods of producing this type of dough, flour is mixed, stored, or kneaded at ambient temperature in conventional manner with water or milk, fat and other dough constituents. Baked goods are shaped of the thus produced dough and the thus shaped dough is then deep frozen at temperatures of between about −15° C. and −30° C. According to other methods, the freshly prepared dough, after being shaped in accordance with the finished baked goods, is partially or completely baked and thereafter deep frozen at temperatures of between about −20° C. and −30° C. Generally it has been found that such baked goods in frozen condition can be kept only for a relatively short period of time, in the average between two and three days, in deep frozen condition since otherwise disadvantages become manifest which have an unfavorable influence on the quality of the finished baked goods.

One of the disadvantages of these methods is due to the fact that all leavening agents start to rise already at room temperatures. Thus if, in accordance with the above discussed methods, the dough is prepared at room temperature, then the leavening agent will become activated already during preparation of the dough and shaping of the same. Furthermore, upon freezing of the dough, a skin is formed on the surface thereof which, upon subsequent defrosting, interferes with the effectiveness of the leavening agent. In the case of short bread or pastry dough to which, at room temperature, ammonium carbonate or baking powder (sodium bicarbonate) has been added, a gradual decomposition of the leavening agent takes place also at the deep freezing temperatures and thereby the taste of the baked goods, after defrosting of the same, is disadvantageously affected.

According to the above discussed conventional methods, the dough, which subsequently is to be deep frozen, is mixed or kneaded in conventional manner and usually will be allowed to stand at room temperature for some time before it is introduced into the deep freezing device. Immediately after producing dough of ambient temperature from constituents which are also of ambient temperature, the surface of the dough will be subject to evaporation phenomena. Consequently, a thin surface layer will be formed on the dough body which has a lower water content than the body of dough underneath the surface layer. This surface layer forms a coherent skin covering the dough body.

It is therefore an object of the present invention to overcome the above discussed difficulties and disadvantages of conventional methods of producing a baking dough which is then to be subjected to deep freezing.

It is a further object of the present invention to produce a baking dough which, upon subsequent deep freezing, can be stored in such deep frozen condition for very long periods of time.

It is yet another object of the present invention to produce a baking dough of prolonged storability in deep frozen condition which, upon subsequent defrosting and baking, will give baked goods of the desired taste and general quality.

Other objects and advantages of the present invention will become apparent from a further reading of the description and of the appended claims.

With the above and other objects in view, the present invention contemplates a method of producing a baking dough of prolonged storability, the dough consisting essentially of flour and of dough constituents adapted to form a dough when admixed to the flour, comprising the steps of cooling the flour to a temperature below about 0° C., intimately mixing the thus cooled flour with the dough constituents so as to form a dough of relatively low temperature due to the low temperature of the fluor, and cooling the thus formed dough to a temperature not higher than about −20° C.

Thus, according to the present invention, deep frozen dough is produced which is ready for baking upon defrosting and which can be stored at deep freezing temperatures not only a few days, but many months, and even, if necessary, for years without any undesirable change in the taste of the baked goods produced of such deep frozen dough after defrosting of the same.

According to the present invention, the flour, prior to mixing it with dough-forming constituents, is cooled to a low temperature which should be at or below 0° C., and preferably between −5° C. and −15° C., and is then, in such cooled condition, mixed with water or milk and/or with oil or other fat and any desired dough-forming flavoring constituents. The mixture is then stirred and kneaded and thereafter cooled to preferably between −20° C. and −30° C. By thus mixing cooled flour with dough-forming constituents which may or may not also be cooled, it is also possible to produce a dough which ab initio has a temperature which preferably will be below 0° C. or at most 0° C., at which any leavening agents will not start to rise. As a result, even upon prolonged storage at deep freeze temperatures such as temperatures between −20° C. and −30° C. and subsequent thawing and baking, no undesirable change in the taste of the completed baked goods will be observed. Furthermore, upon deep freezing, there will be no formation of a skin at the surface of the dough so that, upon thawing or defrosting, there will be no inhibition of the rising or other changes in the dough during the subsequent baking process.

It has been described further above why and in what manner a skin is formed on the dough body produced according to conventional processes. If, however, in accordance with the present invention, the dough is formed at lower temperatures, particularly if the dough is formed with flour having a temperature of below 0° C., then the dough is produced in cold condition and consequenly there is a lesser tendency for evaporation of liquid from the surface of the dough since there is much less tendency of evaporation at low temperatures of the dough surface than when the surface of the dough is warm or at room temperature. Furthermore, due to the fact that the dough is cold, moisture from the surrounding area will be precipitated on the dough surface provided that the temperature of the dough, upon forming of the same, will be about 0° C. or below. Thus, by proceeding according to the present invention, there will be no drying out of the dough surface but, to the contrary, a moistening of the dough surface will take place due to the fact that the ambient room temperature surrounding the dough will be higher than the dough temperature, particularly when the temperature of the dough is in the vicinity of 0° C. or below.

It is possible to mix water and other dough constituents with flour which has been precooled to a temperature of, for instance, between −5° C. and −15° C., without causing freezing of the thus admixed water.

The reason why such freezing does not occur is twofold. On the one hand, the specific heat or heat capacity of the flour is considerably lower than that of water. As a result thereof, by mixing for instance one gram of flour having a temperature of −10° C. with one gram of water having a temperature of +5° C., the resulting temperature will not be the average of the two temperatures which would be −2.5° C., but a considerably higher temperature.

Furthermore, by mixing the water with the flour and other dough constituents, a paste is formed in which the various constituents are to a larger or a lesser degree dissolved in water. Pure water freezes at 0° C. However, by dissolving in the water dough-forming constituents, for instance salt or sugar, the freezing point of the aqueous solution is lowered. In other words, the thus-formed aqueous solution will remain liquid and will not freeze at temperatures which are somewhat below 0° C.

Due to the lowering of the freezing point and the relatively small specific heat of the flour, it is achieved that, upon mixing water with flour having a temperature of −5° C. to 15° C., the water will not freeze during the forming of the dough.

The conventional method, according to which flour at room temperature is used for producing the dough, and according to which shaped bodies of dough are then frozen, is connected with the further disadvantage that the freezing process loses most of its economic advantages. One of the main purposes of the freezing, i.e. deep freezing of dough and storing of the same in frozen condition, is to be able to prepare the dough or the shaped dough bodies at periods of time when little other work has to be done so that labor is freely available, then to deep freeze the dough bodies and, upon sudden rise in demand, to defrost or thaw the dough bodies, and complete baking of the same. Since frozen dough bodies produced according to the above discussed conventional methods have a storage life in deep frozen condition which amounts only to a few days, it is usually found that the additional work which is caused by the freezing of the dough bodies is not economically justifiable because the dough bodies must be thawed and baking must be completed after a few days, even if there is no such sudden rise in demand. It appears that only by following the method of the present invention does it become possible to store the prepared dough in deep frozen condition for any desired length of time, so that it is now possible to produce any desired amount of dough at times when little other work is to be taken care of, and to freeze the thus produced dough irrespective of whether the frozen dough is to be further processed, i.e., baked, after a few days, a few weeks, or even longer periods of time.

When it is desired to produce a yeast dough, according to the present invention, the yeast is added to the water or milk which then is to be added to the precooled flour, the latter preferably having a temperature of between −15° C. and −20° C. In order to avoid that thereby the temperature of the flour is raised to an undesirable degree, particularly in order to avoid that the temperature of the dough mixture will be higher than 0° C., it is desirable in such cases to cool the water or the milk prior to mixing with the flour to a temperature below ambient or room temperature, for instance to a temperature of between +5° C. and +10° C.

When it is desired to produce pastry dough, then the flour which has been cooled to a low temperature, preferably to a temperature of −5° C. to −15° C., is stored or kneaded with a mixture of powdered sugar, milk or water and fat, as well as or optionally with other flour and dough-forming constituents known in the art, until a smooth dough is obtained and the same is then cooled to between about −20° C. and −30° C. In this case, too, it is desirable that the mixture of powdered sugar, milk or water, and fat, as well as any other additions, are maintained at such a low temperature that the mixture, with the precooled flour or the dough formed of flour and these other constituents, will have a temperature which should not be substantially higher than 0° C. In this case, it is not necessary to add a special leavening agent since the powdered sugar, together with the liquid and the fat, will suffice to develop a rising force which suffices after heating of the deep frozen dough for producing the desired baked goods, such as pastry.

In order to introduce water, milk, oil, butter, margarine, or other fats, into the precooled flour having a temperature of between −5° C. and 15° C. without forming lumps thereby, it is suggested, according to another embodiment of the invention, to admix these dough-forming constituents to the precooled flour as a finely subdivided spray in cooled condition. In this manner such a fine distribution of these dough-forming constituents in the flour can be achieved that lump formation will be avoided. The addition of the sprayed dough-forming constituents can be carried out in a conduit through which the cold flour passes and which may be subjected to a shaking motion so that the sprayed materials will contact not only the surface, but also the lower layers of the cooled flour passing through the conduit.

The cooled dough, which is prepared according to the present invention, may then be subdivided into larger or smaller dough bodies, for instance into dough bodies having a weight of 500 or 1,000 grams and may then be stored in the deep freezer at temperatures of about −20° C. and −30° C.

From the deep freezer the thus subdivided and if desired wrapped dough may then be passed in frozen condition to the point of baking. In other words, the frozen dough may be worked up at the place where it has been produced or it may pass to storage, wholesaler, retailer or to institutional consumers, retail bakeries, etc. Thus, for instance, the final defrosting and baking may also be carried out by a housewife. It is not necessary to immediately defrost the deep frozen dough when it reaches the point of baking. Thus, for instance, the deep frozen dough may be kept for a few days in a cooler, not necessarily at the lower temperature of −20° C. and −30° C. but, for instance, in the freezing compartment of a home refrigerator, without any disadvantageous effects. At lower temperatures such storage may be prolonged.

When the thus stored dough is to be baked, it suffices, depending on the size of the dough body, to keep the same at room temperature for, for instance, two hours. Thereafter the dough may be deformed and baked in conventional manner. Prior to baking, the thawing of the dough must be carried out to such an extent that even the coldest part of the dough in the center of the dough body can be kneaded. However, this might, and generally it will, be possible at temperatures somewhat below 0° C.

Consequently, it is also possible to thaw the deep frozen dough not only at temperatures above 0° C., but also at surrounding temperatures of somewhat below 0° C. The deep frozen dough has a temperature of between —20° C. and —30° C. The composition of the dough may be such that the lowering of the freezing point of the water therein will permit thawing of the dough even at surrounding temperatures of —5° C. Particularly when the dough is produced with relatively little water and relatively large proportion of fat or oil, such dough which is thawed at surrounding temperature of —5° C. will be kneadable throughout. Obviously the thawing at lower surrounding temperatures will take a longer period of time than the thawing at higher surrounding temperatures, as is described in some of the examples.

The following examples are given as illustrative only, without, however, limiting the invention to the specific details of the examples.

EXAMPLE 1

*Deep-frozen pastry dough without leavening agent*

A pastry dough is produced by forming a first mixture of 2 kilograms of powdered sugar at ambient temperature which is dissolved in 0.375 litters of milk or water, also at room temperature.

A second mixture is made by stirring 6 eggs, 20 grams of lemon peel and 30 grams of salt into 3 kilograms of butter.

Mixtures 1 and 2 are then combined and stirred so as to form an intimate mixture thereof. The thus formed combined mixture is then cooled to a temperature somewhere between 0° C. and —10° C. It would also be possible to cool each of mixtures 1 and 2 separately to a temperature of between 0° C. and —10° C. prior to combining the two mixtures. However, by separately cooling the two mixtures, it becomes somewhat more difficult to form an intimate mixture by stirring the two mixtures together. For this reason it is advantageous not to cool the individual mixtures 1 and 2, but to carry out the cooling only after these two mixtures have been combined.

The thus cooled combined mixture is then mxied and kneaded with 5 kilograms of wheat flour which had been precooled to a temperature of between —5° C. and —15° C. The thus formed dough should have a temperature of between about 0° C. and —10° C. and this can easily be accomplished by cooling the combined mixture to such temperature between 0° C. and —10° C. and the flour to such temperature between —5° C. and —15° C. that, upon combining of the same and forming a dough thereof, the desired temperature of about between 0° C. and —10° C. is obtained.

EXAMPLE 1A

The thus formed pastry dough is then subjected to deep freezing either in bulk or in portions, for instance, rectangular blocks each weighing 0.5 kilogram or 1.0 kilogram or the like, at a temperature of between —15° C. and —30° C.

The thus deep frozen dough may be stored for years without any impairment of its quality.

When it is desired to form baked goods such as pastry of the thus deep frozen dough, the same is exposed to room temperature. Thawing of dough blocks weighing 0.5 kilogram will take between about 1 and 1½ hours, thawing is completed when the entire dough, even the innermost portion thereof, has reached a sufficiently high temperature so as to be kneadable. The dough is then shaped as desired and baked in conventional manner.

EXAMPLE 1B

When it is desired to store the cooled pastry dough in the final shape of the baked goods which eventually will be produced therefrom, then the pastry dough which had been formed at a temperature of between 0° C. and —10° C. is exposed to room temperature until it is kneadable throughout.

In order to produce a certain type of pastry, the kneadable dough is then placed into round or square aluminum foil molds so as to form in such a mold a dough layer having a thickness of about 1 centimeter. Fruit, jam poppy seed, or nut paste, or the like, is then placed on top of the dough and covered with a thin layer of dough or a latticework formed of dough.

Thereafter, the thus completed unbaked pastry is deep frozen and maintained at a temperature of between —20° C. and —30° C.

The deep frozen unbaked pastry may then be stored for prolonged periods of time. When needed, the deep frozen unbaked pastry is permitted to thaw for between 1 and 2 hours and thereafter is baked in conventional manner at a temperature of about 200° C.

EXAMPLE 2

*Deep-frozen pastry dough with leavening agent*

A first mixture is prepared of 1 kilogram finely granulated sugar, 1.5 kilograms butter or margarine and 4 eggs, all of which ingredients are at room temperature. An intimate mixture is produced by stirring.

A second mixture is prepared of 0.25 liter water or milk at room temperature in which 10 grams ammonium carbonate and 20 grams salt are dissolved, and to which 5 grams ground lemon peel are added.

Mixtures 1 and 2 are now combined and kneaded together with 2500 grams wheat flour, the latter being maintained at a temperature of between 0° C. and —10° C., however not below —10° C. The thus formed dough is separated into portions of desired weight, for instance portions of 500 grams, 1000 grams, or 1500 grams, packed and deep frozen at a temperature of —20° C. and —30° C.

Before baking the thus deep frozen and stored dough, the same has to be thawed so as to be again of kneadable condition. This can be accomplished by exposing the deep frozen dough portions to room temperature for a period of about 1 hour.

Thereafter, the thus defrosted dough can be shaped as desired and then baked in conventional manner.

EXAMPLE 3

*Deep-frozen yeast dough for rolls, wheat bread and the like*

A first mixture is produced by distributing 1500 grams of yeast in 25 liters of water having a temperature of between +5° C. and +15° C.

A second mixture is made of 500 grams of powdered milk or a baking aid such as syrup or malt flour, and 500 grams of salt and is stirred with vegetable oil so as to form thereof a highly viscous liquid. The constituents of the second mixture are combined at room temperature.

A dough is formed by kneading the first mixture with 50 kilograms of flour having a temperature of between —5° C. and —15° C. When kneading is about half-way completed, the second mixture is added and kneading continued until a homogeneous dough has been formed.

The temperature of the thus formed dough will be between about 0° C. and +5° C. The dough is separated into blocks weighing between about 1 and 2 kilograms, deep frozen at a temperature of between about —20° C. and —25° C., packed in freezer paper and may then be stored for years at deep freeze temperature without impairment of its quality.

When it is desired to use the deep frozen dough block, the same is thawed either at a temperature of between —5° C. and +5° C. for a period of about 12 hours, or more quickly in about 4 hours at a temperature of between +15° C. and +25° C. In the first hour after thawing, the dough is again kneaded once or twice in order to speed up the rising of the dough. Thereafter dough portions of the desired weight and shape are formed, and the thus shaped dough is allowed to rise once more and is then baked in conventional manner.

EXAMPLE 4

*Deep-cooled yeast-containing dough for baking cake*

A first mixture is formed by distributing 5 kilograms of yeast in 23 liters of water or milk having a temperature of between +10° C. and +15° C.

A second mixture is formed by intimately stirring 7,850 grams sugar, 500 grams salt, and 400 grams ground lemon peel into 7,850 grams of cooking oil, all ingredients having a temperature of about +10° C. Thereafter, 60 fresh eggs are stirred into this mixture.

50 kilograms of wheat flour of the German standard type 405 are cooled to a temperature of between −5° C. and −15° C., and thereafter sifted into a dough mixer in which the flour is placed so as to form a wall across the interior of the dough mixer, thereby forming two indentations in the bowl of the dough mixer separated from each other by the wall of flour. The first mixture is placed in one of these indentations and the second mixture into the other of these indentations. It is thereby prevented that the first and second mixture will come in direct contact with each other prior to being intimately mixed with the flour because, upon such direct contact, the oil-salt-sugar mixture would considerably reduce the rising power or leavening effect of the yeast.

The entire contents of the dough mixer are now kneaded to form a dough and the thus formed dough is then separated into pieces weighing, respectively, 500 grams, or 750 grams, or 1,000 grams. The thus formed pieces are then wrapped and deep frozen at between −20° C. and −30° C. At such deep temperatures, the dough may then be stored for years without impairment of its quality.

Prior to baking, the dough is thawed, for instance, at a temperature of −5° C. and +5° C. for a period of between about 8 and 12 hours, for instance overnight, or at temperatures of between +15° C. and +25° C. for a period of between 2 and 3 hours.

EXAMPLE 4A

After thus thawing the dough, the same is allowed to rise for about 1 hour and is then kneaded once or twice in order to speed up the leavening action and to obtain baked goods of looser consistency and larger volume. The shaped baking goods are then placed on baking sheets and permitted to rise for about 30 minutes. Baking is then carried out in conventional manner at 200° C.

The last described dough may be used, for instance, for stollen, twists, pretzels, and many other types of baked goods.

EXAMPLE 4B

If the last described dough is to be stored in baking forms, then it is possible to allow the dough prior to deep cooling or freezing, or after deep freezing and thawing, to rise for 1 hour and the dough is then rolled into layers of about 1 centimeter thickness. The dough layer is then placed in aluminum baking dishes of the desired shape and filled with fruit, jam, nut mass, or the like, and covered with a thin layer of the dough or with streusel. The thus formed unbaked cake is then deep cooled at a temperature between −20° C. and −30° C., and may be stored in such condition for years.

Prior to baking, the cake is allowed to thaw for about 2 hours and baking is then carried out in conventional manner at a temperature of about 200° C.

EXAMPLE 4C

A layered yeast dough or flaky dough is made of the last described frozen dough, allowing the same to thaw, and then to rise for about 1 hour, while kneading the dough once or twice. Thereafter, for each kilogram of dough, 150 and 200 grams of butter, which has been cooled to the temperature of the dough, are incorporated in the dough in the following manner.

After rising of the dough is completed, the same is rolled into the shape of a rectangular sheet. The butter, or margarine, is then rolled upon one-half of the dough sheet, and the other half of the dough sheet, which is not covered by the butter, is turned over upon the butter-covered dough sheet and pressed against the same along the periphery of the thus formed sheet of half the size of the initial sheet.

The thus formed sandwich structure is then again rolled to about its original rectangular shape and dimension, and then one-third of the thus formed sheet is turned over upon the center portion of the sheet and the other outer third is superposed thereon. This process is repeated by again rolling the superposed sheets to a thickness of about 0.5 centimeters, and of the thus formed multi-layered dough, pretzels or other pastry shapes may be formed which are then allowed to rise for about 30 minutes, followed by baking at about 200° C.

EXAMPLE 5

*Deep-frozen yeast dough produced in baking forms*

A first mixture is formed by distributing 5 kilograms yeast in 23 liters of water or milk maintained at a temperature of between +10° C. and +15° C.

A second mixture is formed by intimately stirring 8,500 grams sugar, 500 grams salt, and 500 grams ground lemon peel into 8,500 grams of cooking oil, all of which ingredients are maintained at a temperature of about +10° C., and by stirring between 80 and 100 fresh eggs into this mixture.

50 kilograms of wheat flour of the German standard type 405 are cooled to a temperature of between +5° C. and −15° C., and then sifted into the bowl of a kneading apparatus. The flour is arranged in the bowl so as to form a wall therein, separating the lower portion of the bowl into two indentations. The first mixture is then placed into one of these indentations, and the second mixture into the other indentation. Thereafter the contents of the bowl are kneaded to form a dough thereof, and the thus formed dough is introduced into a funnel-filling device and filled therefrom, through the funnel in predetermined amounts by weight into aluminum baking dishes which pass on a conveyor belt below the filling funnel.

It is possible to incorporate in the dough mass ground nuts, almonds, fruits, cocoa, or the like.

The thus filled aluminum baking dishes are then deep cooled at between −25° C. and −30° C.

When it is desired to work up the dough which has been stored in deep frozen condition, the aluminum baking dishes with the dough therein are subjected to thawing, for instance, at a temperature of −5° C. to +5° C. for a period of 8 and 10 hours, or at temperatures of between +15° C. and +25° C. for periods of between about 2 and 3 hours. The thus unfrozen dough is then baked in the aluminum baking dishes in conventional manner at an oven temperature of 200° C.

EXAMPLE 6

*Deep-cooled pastry dough without leavening agent produced by a spraying method*

10 kilograms of powdered sugar, 15 kilograms butter or margarine, 30 eggs, 150 grams salt, 2 liters milk or water, and 100 grams citron peel, all of these ingredients being at a temperature of between +10° C. and +15° C. are worked up in a centrifuge so as to form an emulsion thereof.

The thus formed emulsion is then sprayed through one or more spray nozzles onto 25 kilograms of wheat flour maintained at a temperature of −25° C. to −15° C. The wheat flour may be passed, for instance, through an open conduit which is subjected to a shaking motion while the emulsion is sprayed onto the flour so as to form an intimate mixture between the flour and the emulsion. This mixture is then kneaded to form a dough thereof, and separated into blocks weighing between 1 and 2 kilograms, which blocks are then deep cooled at between —20° C. and —30° C.

The dough is then stored in this condition for any desired length of time.

Prior to use, the dough blocks are thawed for between about 1 and 2 hours until the temperature of the dough has risen sufficiently so that the entire dough mass, including the center portion of the blocks, is in kneadable condition.

Thereafter, pastry is produced thereof, for instance, as described in Example 1.

EXAMPLE 7

*Deep-cooled yeast dough produced by a spraying method*

7,850 grams sugar, 7,850 grams oil, 500 grams salt, 60 fresh eggs, 500 grams lemon peel and 15 liters of water or milk, all of these ingredients being at a temperature of between +5° C. and +10° C., are worked up in a centrifuge to form an emulsion.

A mixture is formed of 5 kilograms yeast and 8 liters water or milk having a temperature of between +5° C. and +10° C.

The emulsion and the mixture are sprayed through spray nozzles onto 50 kilograms of wheat flour of the German standard type 405, which wheat flour is maintained at a temperature of between 0° C. and —15° C.

The thus formed mixture is then kneaded to form a dough and subdivided into blocks of desired weight, weighed, packed into freezer paper, and deep frozen at between —20° C. and —30° C. The deep frozen dough may be stored for any desired length of time without impairment of its quality and thereafter baked goods may be produced therefrom, as, for instance, described in Example 4.

It has been found that the unobvious and advantageous results of the present invention are achieved by preventing the dough during its formation and prior to deep freezing of the same from reaching a temperature exceeding 10° C. In fact, 10° C. is the highest temperature which the dough may reach during its foramtion and prior to deep freezing, but it is preferable that the maximum temperature of the dough does not exceed between about 5° and 8° C.

If the dough is permitted during its formation to exceed a temperature of +10° C., then the following disadvantageous consequences will occur:

(a) The leavening agents in the dough are activated and, once the leavening agents are activated by reaching a temperature of 10° C., they will continue their activity even upon cooling of the dough below +10° C. Thereby the taste of the dough and of the baked goods formed thereof when the dough, after deep freezing and defrosting, is baked, will be impaired and, furthermore, less than the desired degree of rising of the dough will take place during baking.

(b) It will not be avoided that a skin forms on the surface of the dough and that this impairs the baking qualities of the same as has been discussed further above.

These two disadvantages are overcome according to the present invention, according to which the dough during its formation does not reach a temperature higher than +10° C. and preferably only a somewhat lower temperature. The thus formed dough can then be deep frozen and stored for years without impairment of its taste and baking properties.

In order to prevent that the dough during mixing of the same will acquire a temperature higher than +10° C., it will be necessary to take into account the higher ambient temperature and the higher temperature of the materials which are added to the flour which generally will be found during the warm season of the year. Consequently, when preparing dough according to the present invention during the warm season, generally, the flour must be cooled to a lower temperature than when such dough is prepared during the cold season so that in any event the completed dough will have a temperature not exceeding +10° C.

While the foregoing describes and explains the maximum temperature of the dough, the minimum temperature of the dough prior to deep freezing of the same is determined by the requirement that the dough must be in kneadable condition. Below a certain temperature it is no longer possible to knead the dough. The lowest temperature at which the dough may be kneaded depends on the type and amount of the dough constituents which are added to the flour. For instance, when oil is used as the fatty substance in the dough, the latter can be kneaded at a lower temperature than when the oil is replaced with butter or margarine.

Thus, the temperature of the dough during mixing of the same depends on the temperature of the flour, the temperature of the water which is incorpoarted in the dough, and the temperature of the surrounding atmosphere. A fourth factor, but of relatively minor importance, will be the temperature of the dough forming constituents which are added to the flour, such as, fat, sugar, leavening agents, etc. However, the dough constituents other than flour and water are present in relatively small proportions and thus have only very limited effect on the temperature of the freshly prepared dough.

The room temperature or temperature of the ambient atmosphere is of importance because the dough during formation of the same is exposed thereto and comes in intimate contact with the surrounding air due to kneading or stirring. This results in a rather intensive heat exchange between the dough and surrounding air.

It has been found that the conditions required according to the present invention, namely, that the temperature of the freshly formed dough and of the dough mass during formation of the dough will not exceed +10° C., can be met by determining the temperature of the flour, of the water and the temperature of the ambient air, all expressed in centigrade, adding these three temperatures and dividing by three. The result must be below 10 and preferably between 6 and 8.

For instance, assuming that dough is produced during the warm season at a room temperature of +25° C., with water of +15° C. and flour which has been precooled to —15° C., then these three temperatures will add up to +25° C., and divided by three to +8.3° C.

It thus can be assumed that the dough will have a temperature of very close to +8.3° C. Since this temperature already approaches or is rather close to the maximum permissible temperature of +10° C., it is advisable in this case to cool the water from +15° C. to +10° C. or below.

Assuming that the water has been cooled to —10° C., while the room temperature remains +25° C. and temperature of the precooled flour —15° C., then the combined temperature will be +20° C., and divided by 3, +6.7° C. A dough temperature of +6.7° C. prior to deep freezing is preferred over a dough temperature of +8.3° C. because it is farther removed from the maximum permissible temperature of +10° C. while still permitting kneading of the dough.

During the cold season, the room temperature generally is lower and so is the temperature of the water as it comes from the faucet.

Assuming that during the cold season the dough is produced at a room temperature of +10° C., a water temperature of +8° C. and a temperature of the precooled flour of +5° C., one will arrive at a combined temperature of +23° C., or divided by three, a temperature of +7.6° C. While this temperature is already nearly 2½° C. below the maximum permissible temperature, it still will be desirable in most cases to precool the flour to a somewhat lower temperature, for instance, 0° C. in order to arrive at a dough temperature which is considerably lower than +10° C. but still high enough to permit kneading of the dough. For instance, by cooling the flour to 0° C., the dough temperature will be reduced from about 7.6° C. to about 6.0° C.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of producing frozen baking dough of prolonged storability, said dough consisting essentially of flour, leavening and other dough constituents adapted to form a dough when mixed with said flour, comprising the steps of cooling at least said flour to a temperature not exceeding 5° C.; mixing said cooled flour with said leavening and said other dough constituents in such a manner that the temperature of said mixture does not exceed 5° C.; kneading said dough while maintaining it at a temperature not exceeding 5° C.; and freezing the thus kneaded dough without permitting its temperature to rise between said kneading and said freezing to a temperature above 5° C.

2. A method of producing frozen baking dough of prolonged storability, said dough consisting essentially of flour, leavening and other dough constituents adapted to form a dough when mixed with said flour, comprising the steps of cooling said flour to a temperature below about 0° C.; intimately mixing the thus cooled flour with said leavening and said other dough constituents so as to form a cold dough having when formed a temperature of between about +5° C. and −10° C. due to the low temperature of said flour; and freezing the thus formed cold dough without permitting its temperature to rise between formation of said dough and freezing thereof to a temperature above about 5° C.

3. A method as defined in claim 2, wherein said flour is cooled to a temperature between about −5° C. and −15° C., and the cold dough is frozen at a temperature of between about −20° C. and −30° C.

4. A method as defined in claim 2, wherein said cold dough when formed has a temperature of between +5° C. and −10° C.

5. A method as defined in claim 2, wherein, in addition to said flour, at least a portion of the other dough constituents is cooled prior to forming said cold dough.

6. A method as defined in claim 2, wherein at least a portion of the other dough constituents is sprayed onto the cooled flour.

7. A method as defined in claim 2, wherein said other dough constituents include water and a fatty substance.

8. A method as defined in claim 2, wherein said leavening and said other dough constituents include a substance selected from the group consisting of water and milk, and also include yeast distributed in said substance.

9. A method as defined in claim 2, wherein said other dough constituent include sugar, a fatty substance and at least one substance selected from the group consisting of milk and water.

10. A method as defined in claim 2, wherein said cold dough when formed has a temperature of between about 0° C. and −10° C.

References Cited

UNITED STATES PATENTS

| 1,870,882 | 8/1932 | Ward | 99—92 |
| 2,810,650 | 10/1957 | Joslin | 99—92 X |

FOREIGN PATENTS 550,983   12/1957   Canada.

LIONEL M. SHAPIRO, *Primary Examiner.*

JOSEPH M. GOLIAN, *Examiner.*